United States Patent
Majmundar et al.

(10) Patent No.: US 11,606,248 B2
(45) Date of Patent: *Mar. 14, 2023

(54) INTEGRATED ACCESS BACKHAUL NETWORK ARCHITECTURE TO SUPPORT BEARER AGGREGATION FOR 5G OR OTHER NEXT GENERATION NETWORK

(71) Applicant: AT&T Intellectual Property I, L.P., Atlanta, GA (US)

(72) Inventors: Milap Majmundar, Austin, TX (US); Thomas Novlan, Cedar Park, TX (US); Arunabha Ghosh, Austin, TX (US); Andrew Thornburg, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/179,120

(22) Filed: Feb. 18, 2021

(65) Prior Publication Data

US 2021/0194761 A1    Jun. 24, 2021

Related U.S. Application Data

(63) Continuation of application No. 16/295,938, filed on Mar. 7, 2019, now Pat. No. 10,958,511.

(Continued)

(51) Int. Cl.
  *H04L 41/0803* (2022.01)
  *H04W 84/04* (2009.01)

(52) U.S. Cl.
  CPC ....... *H04L 41/0803* (2013.01); *H04W 84/042* (2013.01)

(58) Field of Classification Search
  CPC .. H04L 41/0803; H04W 84/042; H04W 24/02
  See application file for complete search history.

(56) References Cited

U.S. PATENT DOCUMENTS

| 9,351,192 | B2 | 5/2016 | Wang et al. |
| 9,755,726 | B2 | 9/2017 | Balachandran et al. |
| (Continued) | | | |

FOREIGN PATENT DOCUMENTS

| WO | 2015139729 A1 | 9/2015 |
| WO | 2019194737 A1 | 10/2019 |

OTHER PUBLICATIONS

Notice of Allowance dated Mar. 1, 2021 for U.S. Appl. No. 16/356,679, 26 pages.

(Continued)

*Primary Examiner* — Rina C Pancholi
(74) *Attorney, Agent, or Firm* — Amin, Turocy & Watson, LLP

(57) ABSTRACT

In a 5G network, an integrated access and backhaul (IAB) deployment in a 5G network, can enable aggregation of multiple user equipment (UE) bearers into backhaul bearers based on factors such as route information of UE bearers and quality of service of UE bearers. Additionally, an adaptation layer can be configured to perform aggregation of data from UE bearers into backhaul bearers either above or below a radio link control layer. Thus, aggregation of data from UE bearers into backhaul bearers can be performed either above the RLC or below the RLC to take advantage of benefits from both options.

20 Claims, 14 Drawing Sheets

Related U.S. Application Data

(60) Provisional application No. 62/754,124, filed on Nov. 1, 2018.

(56) References Cited

U.S. PATENT DOCUMENTS

| | | | |
|---|---|---|---|
| 9,780,997 | B2 | 10/2017 | Grinshpun et al. |
| 9,781,610 | B2 | 10/2017 | Das et al. |
| 9,974,052 | B2 | 5/2018 | Wang et al. |
| 10,015,832 | B2 | 7/2018 | Zhang et al. |
| 10,028,328 | B2 | 7/2018 | Kwon |
| 10,028,331 | B2 | 7/2018 | Fujishiro et al. |
| 10,034,221 | B2 | 7/2018 | Cao et al. |
| 10,050,894 | B2 | 8/2018 | Karaki et al. |
| 2003/0131121 | A1 | 7/2003 | Quittek et al. |
| 2011/0194535 | A1 | 8/2011 | Johansson et al. |
| 2015/0029913 | A1 | 1/2015 | Zhou et al. |
| 2016/0119939 | A1 | 4/2016 | Himayat et al. |
| 2016/0192266 | A1 | 6/2016 | Dai et al. |
| 2017/0006499 | A1 | 1/2017 | Hampel et al. |
| 2017/0013529 | A1 | 1/2017 | Persson et al. |
| 2017/0064731 | A1 | 3/2017 | Nang et al. |
| 2017/0188253 | A1 | 6/2017 | Bergstrom et al. |
| 2017/0311251 | A1 | 10/2017 | Liu et al. |
| 2017/0331670 | A1 | 11/2017 | Parkvall et al. |
| 2018/0027524 | A1 | 1/2018 | Zhang et al. |
| 2018/0063014 | A1 | 3/2018 | Yu et al. |
| 2018/0092139 | A1* | 3/2018 | Novlan .............. H04W 76/12 |
| 2018/0192412 | A1 | 7/2018 | Novlan et al. |
| 2018/0270875 | A1 | 9/2018 | Hampel et al. |
| 2018/0279188 | A1 | 9/2018 | Tenny et al. |
| 2019/0223078 | A1* | 7/2019 | Sirotkin .............. H04B 7/2606 |
| 2019/0289492 | A1* | 9/2019 | Hampel ................ H04W 76/12 |
| 2019/0372887 | A1* | 12/2019 | Majmundar ............ H04L 47/34 |
| 2020/0015147 | A1 | 1/2020 | Malkamaki et al. |
| 2020/0036484 | A1 | 1/2020 | Kim |
| 2021/0127430 | A1* | 4/2021 | Teyeb ..................... H04L 67/56 |

OTHER PUBLICATIONS

AT&T, et al. "Study on Integrated Access and Backhaul for NR." 8881123GPP TSG RAN Meeting #75, Dubrovnik, Croatia, Mar. 6-9, 2017. 5 pages.

"Adaptation layer in MT", Qualcomm Incorporated, 3GPP TSG-RAN WG2 Meeting #103bis, Chengdu, China, Oct. 8-12, 2018. 8 pages.

3rd Generation Partnership Project. "3GPP TR 38.874 V0.4.0 (Aug. 2018): Study on Integrated Access and Backhaul." 3GPP, Aug. 2018. 55 pages.

International Search Report and Written Opinion received for PCT Application Serial No. PCT/US2019/054814 dated Dec. 9, 2019, 14 pages.

Ericsson et al., "Way Forward on Bearer Mapping for IAB Network", URL : http://www.3gpp.org/ftp/tsg%5Fran/WG2%5FRL2/TSGR2%5F103bis/Docs/R2%2D18143642Ezip, Sep. 27, 2018, 20 pages.

ZTE., "Discussion on QoS and bearer mapping for IAB", URL : http://www.3gpp.org/ftp/tsg%5Fran/WG2%5FRL2/TSGR2%5F102/Docs, May 11, 2018, 20 pages.

Ericsson, "TP to TR 38.874 on QoS Handling for the Adaptation layer above RLC layer", URL : http://www.3gpp.org/ftpjtsg%5Fran/WG3%5Fiu/TSGR3%5F101/Docs/R3%2D184930%2Ezip, Aug. 10, 2018, 20 pages.

Catt, "Bearer Mapping and QoS handling in IAB architecture", URL : http://www.3gpp.orgjftp/tsg%5Fran/WG2%5FRL2/TSGR2%5F103/Docs/R2%2D1811857%2Ezip, Aug. 10, 2018, 20 pages.

ZTE, "Discussion on user plane bearer mapping and comparison", URL : http://www.3gpp.org/ftp/tsg%5Fran/WG2%5FRL2/TSGR2%5F103bis/Docs/R2%2D1814723%2Ezip, Sep. 28, 2018, 20 pages.

Non-Final Office Action received for U.S. Appl. No. 16/356,679 dated Sep. 17, 2020, 37 pages.

3rd Generation Partnership Project;Technical Specification Group Radio Access Network; Study on Integrated Access and Backhaul; (Release 15) 3GPP, 3GPP TR 38.874 V0.5.0 (Oct. 2018), 78 pages.

Non-Final Office Action received for U.S. Appl. No. 16/295,938 dated Aug. 5, 2020, 39 pages.

Hampel et al. U.S. Appl. No. 62/645,095 for QoS Support in Wireless Backhaul Networks Using Cellular Radio-Access Technologies filed Mar. 19, 2018, 37 pages.

Sirotkin et al. U.S. Appl. No. 62/649,295 for Routing Using Integrated Access and Backhaul (IAB) in New Radio (NR) Systems, filed Mar. 28, 2018. 55 pages.

Office Action dated Sep. 22, 2022 for U.S. Appl. No. 17/346,174, 40 pages.

(3GPP TSG-RAN WG3 Meeting #101; R3-184930 ;Gothenburg, Sweden, Aug. 20-24, 2018; Agenda Item 24.1.2.2; Source: Ericsson; Title: TP to TR 38.874 on QoS Handling for the Adaptation layer above RLC layer Document for: pCR to TR 38.874) (Year: 2018).

Notice of Allowance dated Feb. 1, 2023 for U.S. Appl. No. 17/346,174, 41 pages.

\* cited by examiner

INTEGRATED ACCESS BACKHAUL NETWORK ARCHITECTURE TO SUPPORT BEARER AGGREGATION FOR 5G OR OTHER NEXT GENERATION NETWORK

CROSS-REFERENCE TO RELATED APPLICATIONS

This application is a continuation of, and claimed priority to each of, U.S. patent application Ser. No. 16/945,062 (now U.S. Pat. No. 10,958,511), filed Jul. 31, 2020, and entitled "RIDER LOCATION DETECTION AND SHARING SYSTEM," which applications claim priority to U.S. Provisional Patent Application No. 62/881,857, filed on Aug. 1, 2019, and entitled "SYSTEM AND APPARATUS FOR RIDER LOCATION DETECTION, CLASSIFICATION AND REPORTING." The entireties of the aforementioned priority applications are hereby incorporated by reference herein.

TECHNICAL FIELD

This disclosure relates generally to an integrated access backhaul network architecture for a 5G new radio (NR) networks. For example, this disclosure relates to an integrated access backhaul network architecture to support bearer aggregation above and below a radio link control layer for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating an integrated access backhaul network architecture is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
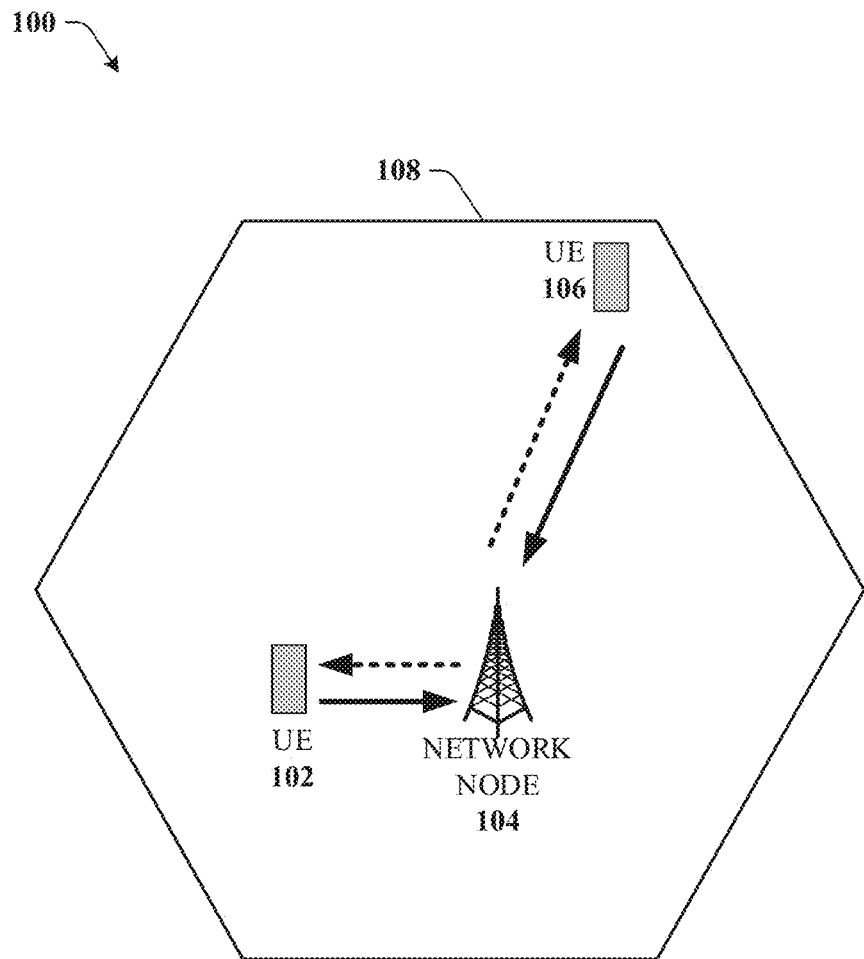
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate an integrated access backhaul network architecture to support bearer aggregation for a 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate an integrated access backhaul network architecture to support bearer aggregation for a 5G network. Facilitating an integrated access backhaul network architecture to support bearer aggregation for a 5G network can be implemented in connection with any type of device with a connection to the communications network (e.g., a mobile handset, a computer, a handheld device, etc.) any Internet of things (JOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

For densely deployed mmWave NR systems, the area covered by an NR nodes can be small, so a dense deployment of NR nodes in a given area can implicate a larger number of deployment sites. When an integrated access backhaul (IAB) is deployed in such an environment with sparse fiber deployment, the large number of deployment sites can create a deployment where multiple IAB hops can be utilized to reach the IAB donor node (e.g., IAB donor has access to fiber). This means that for each UE bearer, a particular route through the multi-hop network can be determined. Moreover, when channel or network conditions change dynamically, the route through the multi-hop IAB network can also change.

Furthermore, data from multiple UE bearers can be aggregated into common backhaul bearers that are established between two IAB nodes. Such backhaul bearers can be referred to as radio link control (RLC) channels. A configuration of many-to-one aggregated backhaul bearers between IAB nodes can be based on one or more factors, including routing information, quality of service (QoS), etc. of the UE bearers that are aggregated into the backhaul bearers. Alternatively, enforcement of aggregation policies and reconfiguration of already established aggregated backhaul bearers, based on mobility events and radio resource management (RRM) triggers such as route changes, link failures, etc. in the IAB network, can facilitate a more efficient network.

To facilitate the more efficient network, an adaptation layer can be configured flexibly to perform aggregation of data from UE bearers into backhaul bearers either above or below the RLC layer. Thus, splitting the adaptation layer into two parts can provide network flexibility. For example, a first adaptation layer (e.g., adapt-hi) can reside above an RLC layer, and a second adaptation layer (e.g., adapt-low) can reside below the RLC layer. Additionally, two different configuration modes of operation for the adaptation layer can be utilized. For example, in a first mode, the adapt-hi layer can be configured to operate in a routing mode, and the adapt-low layer can be configured to operate in a bearer aggregation mode. Alternatively, in a second mode, the adapt-hi layer can be configured to operate in the routing mode and the bearer aggregation mode while the adapt-low layer can be configured to operate in a transparent mode (e.g., receiving and transmitting data as a pass-through layer).

Utilizing multiple adaptation layers and/or multiple modes can allow the aggregation of data from UE bearers into backhaul bearers to be performed either above the RLC or below the RLC. Thus, the system can take advantage of benefits from both options. With aggregation above the RLC, the benefits can comprise the ability to perform routing and aggregation at the same protocol sublayer, thereby considering routing information while performing bearer aggregation. Additionally, it can also reduce the impact on standards for lower protocol stack layers. Similarly, the benefits of performing aggregation below the RLC layer comprise reducing demand for logical channel identifier (LCID) space extension when trying to support 1:1 mapping of UE bearers to backhaul channels.

If there is a scheduler at the MAC layer and the scheduler allocates resources to a bearer, then the scheduler can request the MAC data to fill up the resources. Then the MAC layer can build a transport block to be supplied to the physical layer. When the transport block is built, it can use raw data from various logical channels. Each MAC layer can draw from multiple logical channels and the MAC layers can multiplex data from multiple logical channels into the same transport block. With LCID, to maintain a 1:1 mapping between a logical channel and a backhaul bearer, the LCID range can be expanded. For example, if an IAB node serves three UEs and each UE has a single bearer and traffic from all three bearers can be multiplexed into a single stack hall channel, then a mobile termination (MT) of the IAB node can utilize only one logical channel. However, for a 1:1 mapping between a logical channel and a backhaul RLC channel, for every UE that is being served by the IAB node, then the backhaul link between the MT and the parent IAB node can have a separate logical channel. In a multilayered IAB network where the donor is serving two or three tiers of IAB nodes collectively, supporting many UEs, and the data is being funneled through the donor node, current specifications cannot support all of the logical channels. However, the specifications can be expanded to extend the LCID range. Additionally, the proposed solution possibly makes the standardization process less contentious by allowing proponents of both options to utilize specific network features.

In one embodiment, described herein is a method comprising configuring, by a wireless network device comprising a processor, a user plane control stack of a wireless network, wherein the user plane control stack comprises an adaptation layer. The method can also comprise splitting, by the wireless network device, the adaptation layer into a first adaptation layer and a second adaptation layer, wherein the first adaptation layer is above a radio link control layer, and wherein the second adaptation layer is below the radio link control layer. Additionally, the method can comprise configuring, by the wireless network device, the first adaptation layer to route data packets from mobile devices to wireless network devices of the wireless network.

According to another embodiment, a system can facilitate, configuring a user plane control stack of a wireless network, wherein the user plane control stack comprises an adaptation layer. The system can comprise dividing the adaptation layer into a first adaptation layer and a second adaptation layer, wherein the first adaptation layer is logically above a radio link control layer, and wherein the second adaptation layer is logically below the radio link control layer. Furthermore, the system can facilitate routing data packets from mobile devices to the wireless network via the first adaptation layer.

According to yet another embodiment, described herein is a machine-readable storage medium that can perform the operations comprising configuring a user plane control stack of a wireless network, wherein the user plane control stack comprises an adaptation layer. The machine-readable storage medium can perform the operations comprising splitting the adaptation layer into a first adaptation layer and a second adaptation layer, wherein the first adaptation layer is above a radio link control layer of the user plane control stack, and wherein the second adaptation layer is below the radio link control layer of the user plane control stack. Furthermore, the machine-readable storage medium can perform the operations comprising configuring the first adaptation layer to route data packets from mobile devices to wireless network devices of the wireless network.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000, etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
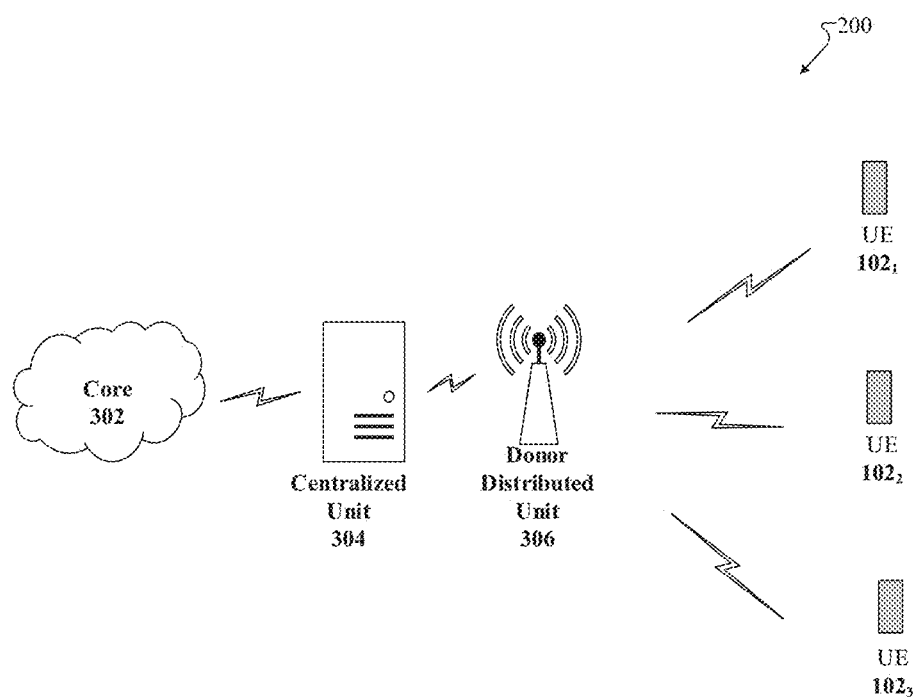
FIG. 2 illustrates an example schematic system block diagram of a new radio access architecture according to one or more embodiments.

Referring now to FIG. 2, illustrated is an example schematic system block diagram 200 of a new radio access architecture according to one or more embodiments. 3GPP NR-based 5G mobile networks can be deployed using a split RAN protocol architecture such that on the user plane the packet data convergence protocol (PDCP) sublayers can reside at a centralized unit (CU) 304, while the radio link control (RLC), media access control (MAC), and physical layer (PHY) layers can reside at the distributed unit (DU) 306. User plane data can be carried on data radio bearers (DRBs) that traverse the above described user plane RAN protocol architecture. On the control plane, signaling radio bearers (SRBs) can be set up to carry control messages from the radio resource control (RRC) layer, also utilize the packet data control protocol (PDCP) layer at the CU, and are further carry the control messages down through the RLC, medium access control (MAC), and physical (PHY) layers at the DU 306 to be delivered to the UE 102 over the air interface. Each network user can be allocated multiple DRBs and SRBs by the network. The network interface between the CU 304 and DU 306 can be called the F1 interface per 3GPP specifications.

Figure 3:
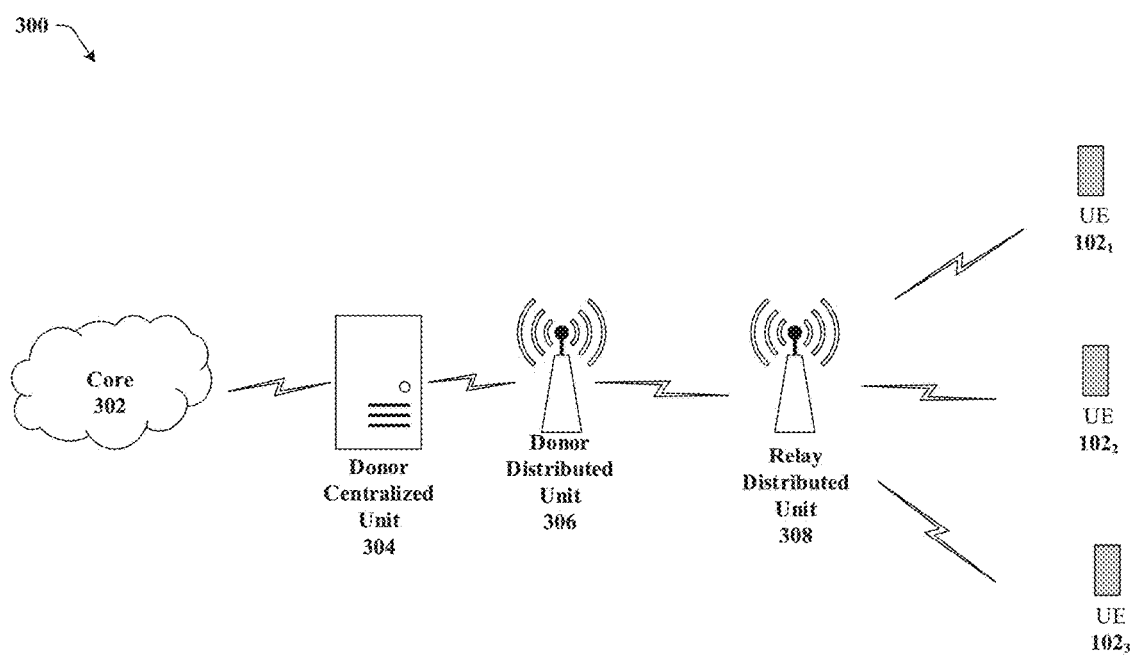
FIG. 3 illustrates an example schematic system block diagram of integrated access and backhaul links according to one or more embodiments.
Figure 4:
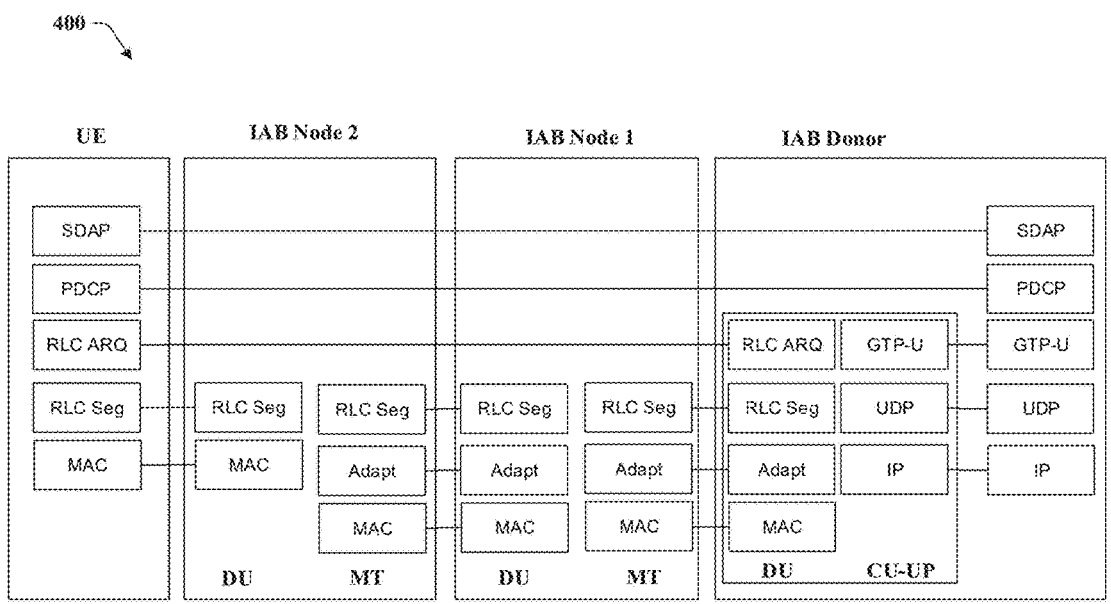
FIG. 4 illustrates an example user-plane protocol design according to one or more embodiments.
Figure 5:
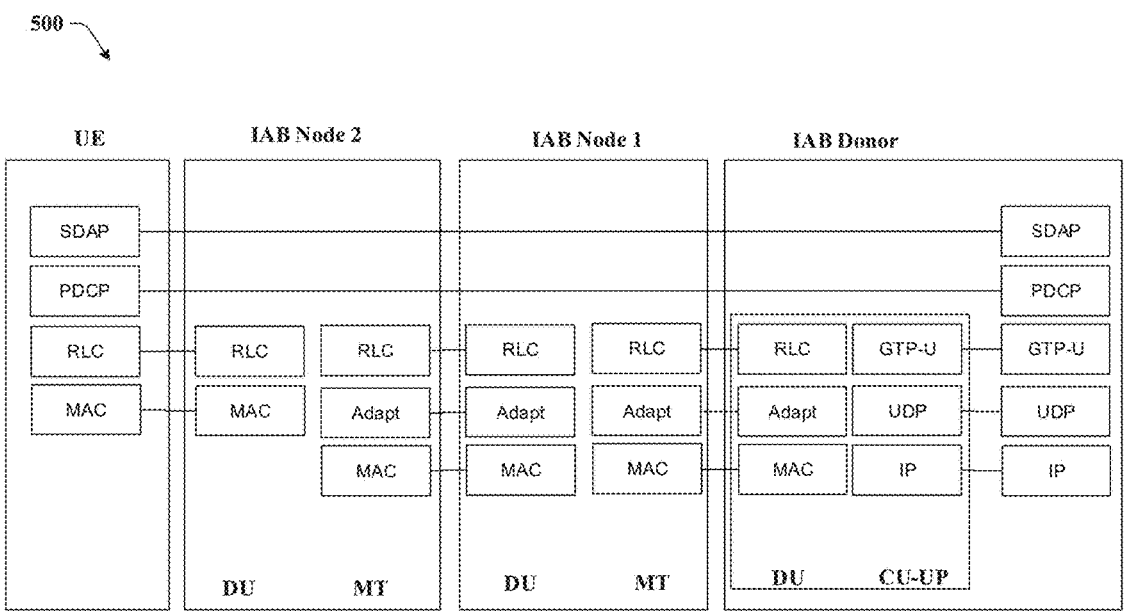
FIG. 5 illustrates an example user-plane protocol design according to one or more embodiments.
Figure 6:
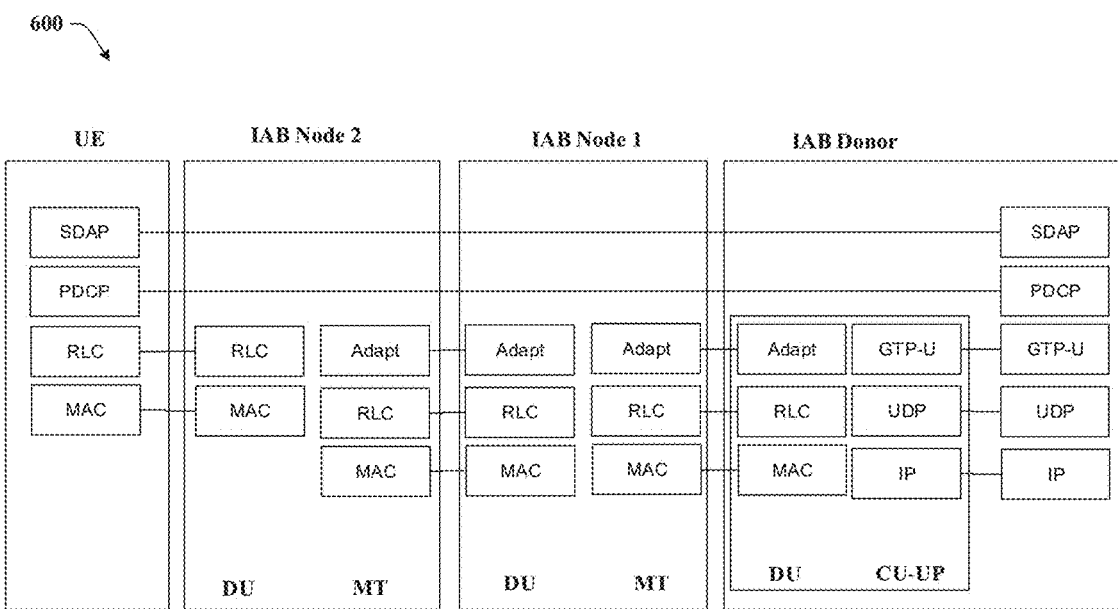
FIG. 6 illustrates an example user-plane protocol design according to one or more embodiments.
Figure 7:
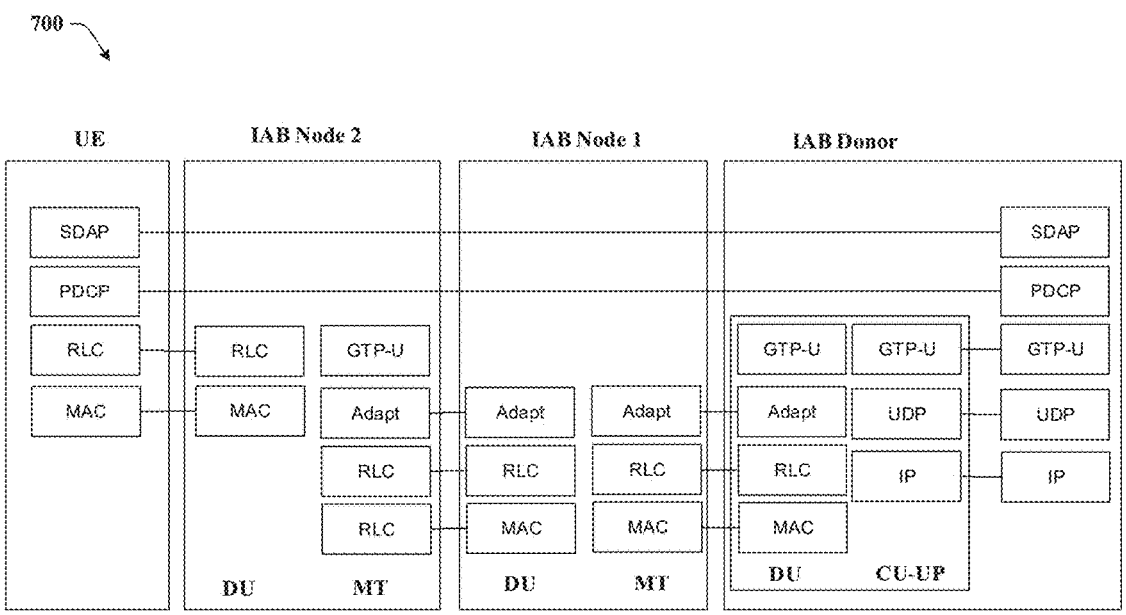
FIG. 7 illustrates an example user-plane protocol design according to one or more embodiments.
Figure 8:
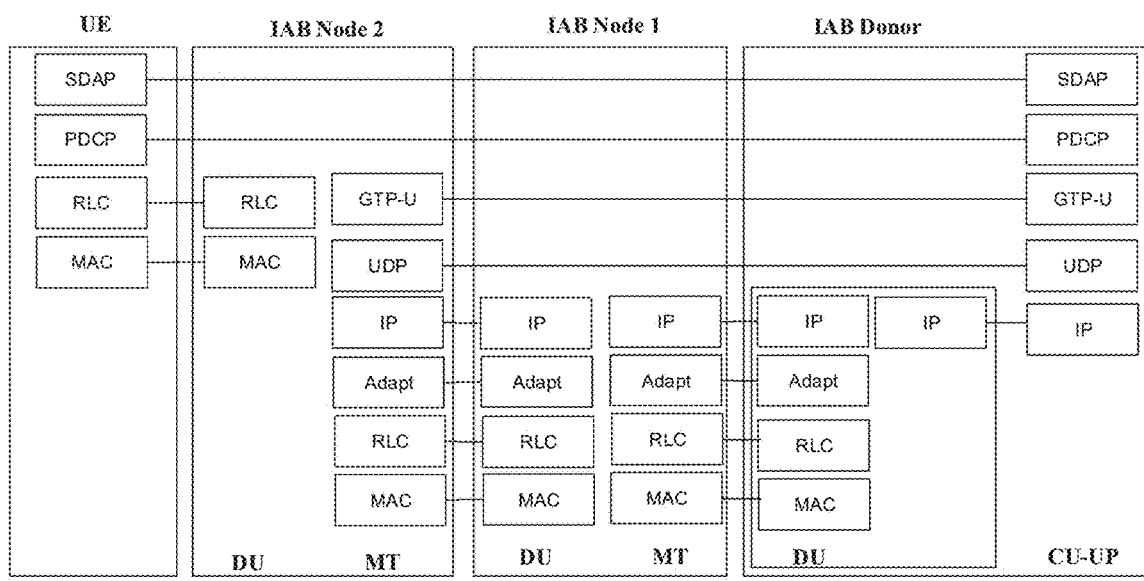
FIG. 8 illustrates an example user-plane protocol design according to one or more embodiments.

Referring now to FIG. 3, illustrated is an example schematic system block diagram of integrated access and backhaul links according to one or more embodiments. An IAB feature can enable future cellular network deployment scenarios and applications to the support wireless backhaul and relay links enabling flexible and very dense deployment of NR cells without the need for densifying the transport network proportionately.

Due to the expected larger bandwidth available for NR compared to LTE (e.g., mmWave spectrum) along with the native deployment of massive MIMO or multi-beam systems in NR, IAB links can be developed and deployed. This can allow easier deployment of a dense network of self-backhauled NR cells in a more integrated manner by building upon many of the control and data channels/procedures defined for providing access to UEs.

For example, the network 300, as represented in FIG. 3 with integrated access and backhaul links, can allow a relay node to multiplex access and backhaul links in time, frequency, and/or space (e.g., beam-based operation). Thus, FIG. 3 illustrates a generic IAB set-up comprising a core network 302, a centralized unit 304, donor distributed unit 306, relay distributed unit 308, and UEs 102$_1$, 102$_2$, 102$_3$. The donor distributed unit 306 (e.g., access point) can have a wired backhaul with a protocol stack and can relay the user traffic for the UEs 102$_1$, 102$_2$, 102$_3$ across the IAB and backhaul link. Then the relay distributed unit 308 can take the backhaul link and convert it into different strains for the connected UEs 102$_1$, 102$_2$, 102$_3$. Although FIG. 3 depicts a single hop (e.g., over the air), it should be noted that multiple backhaul hops can occur in other embodiments.

Referring now to FIG. 4-FIG. 8, illustrated is an example user-plane protocol design according to one or more embodiments. The user-plane protocol 400, 500, 600, 700, 800 architectures depicted in FIGS. 4-8 (e.g., can perform layer-2 based relaying, and the access IAB node (IAB-node 2 in FIGS. 4-8) can serve as a gNB-DU to the NR UE. It should be noted that the gNB-DU at the IAB node can be served by the lower RAN protocol stack layers (PHY, MAC, RLC) via the NR UE, whereas the upper RAN protocol stack layers (PDCP and SDAP) can be served end-to-end between the UE and the gNB-CU-UP.

As depicted in FIG. 4-FIG. 8, the protocol stack shown on the UE side comprises a medium access control (MAC) layer, a radio link control (RLC) layer (e.g., automatic repeat request (ARQ) and/or segmentation), a packet data convergence protocol (PDCP) layer, and service data adaptation protocol (SDAP) layer in the RAN protocol stack. The PDCP and SDAP can be served from the UE to the IAB donor, where the PDCP and SDAP reside at the centralized unit-user plane (CU-UP) on the network side. The IAB serving node (e.g., IAB node 2) goes up to the RLC. The protocol stack from the mobile termination (MT) of the serving IAB node to the distributed unit (DU) of the IAB donor can comprise an adaption (adapt) layer. The adapt layer can perform a routing function from one IAB node (e.g., IAB node 2) to another IAB node (e.g., IAB node 1), and it can perform the function of bearer aggregation.

The adaptation (e.g., adapt) layer can either be above the RLC layer (user-plane protocol 600, 700, 800 alternatives) or below the RLC (user-plane protocol 400, 500 alternatives). For alternatives that place the adapt layer below the RLC (user-plane protocol 400, 500 alternatives), the aggregation of data from multiple UE bearers into one or more backhaul channels can be performed at this adapt layer below the RLC. For alternatives that place the adapt layer above the RLC (user-plane protocol 600, 700, 800 alternatives) the aggregation of data from multiple UE bearers into one or more backhaul channels can be performed at the adapt layer above the RLC.

In the case of alternatives that place the adapt layer above the RLC (user-plane protocol 600, 700, 800), the routing functionality can be a part of the adapt layer. In the case where the adapt layer is below the RLC (user-plane protocol 400, 500), even though it is not shown in the diagrams, there can be a routing sublayer at the top of the protocol stack at each IAB node. So effectively, for the scenario where the adapt layer is above the RLC (user-plane protocol 600, 700, 800), there can be two protocol sublayers, one above the RLC for routing and one below the RLC for bearer aggregation.

Figure 9:
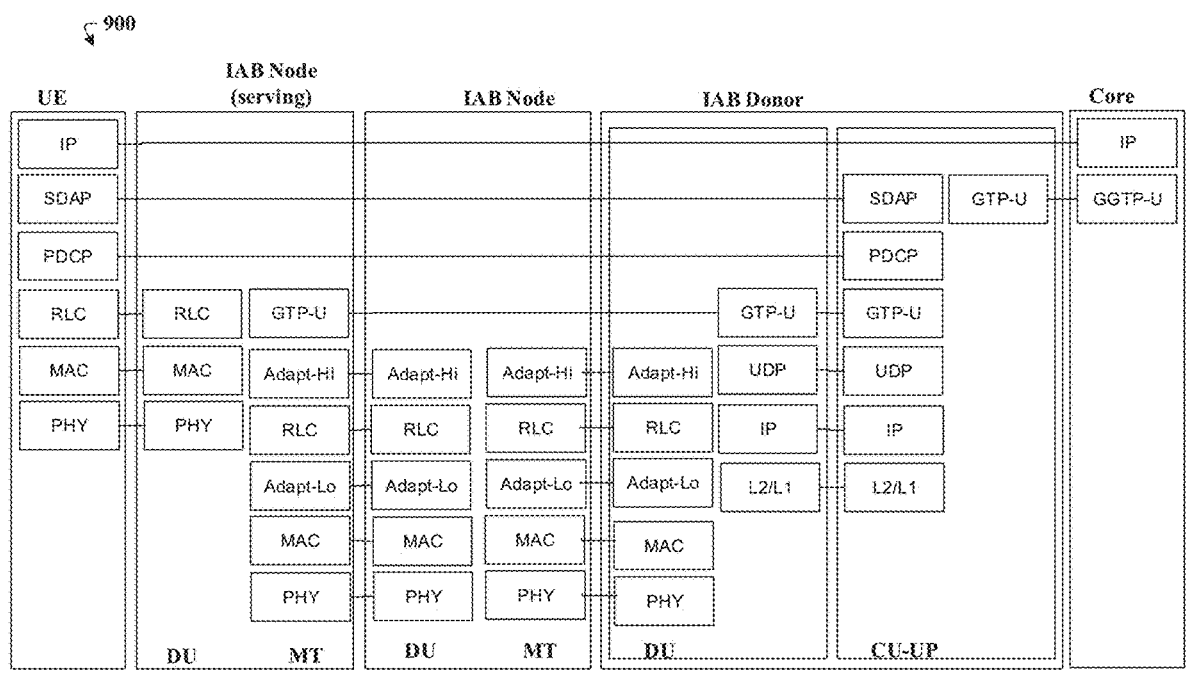
FIG. 9 illustrates an example user-plane protocol design comprising an adaptation layer above and below a radio link channel layer according to one or more embodiments.

Referring now to FIG. 9, illustrated is an example user-plane protocol design 900 comprising an adaptation layer above a radio link channel layer and an adaptation layer below the radio link channel layer according to one or more embodiments. When the IAB nodes are configured to operate the adaptation layer in the first mode, the adapt-hi can perform routing functions, while the adapt-lo can perform bearer aggregation functions. The first mode resembles the way the adaptation layer operates the user-plane protocols 400, 500, 600 above. When the IAB nodes are configured to operate in the second mode, the adapt-hi can perform routing and aggregation functions, while the adapt-lo can perform in a transparent mode, which essentially means that the adapt-lo acts as a pass-through layer between the MAC and the RLC layer without performing any operations on the data packet data units (PDUs). Thus, the second mode can resemble the way the adaptation layer operates in the user-plane protocols 700, 800 above.

Figure 10:
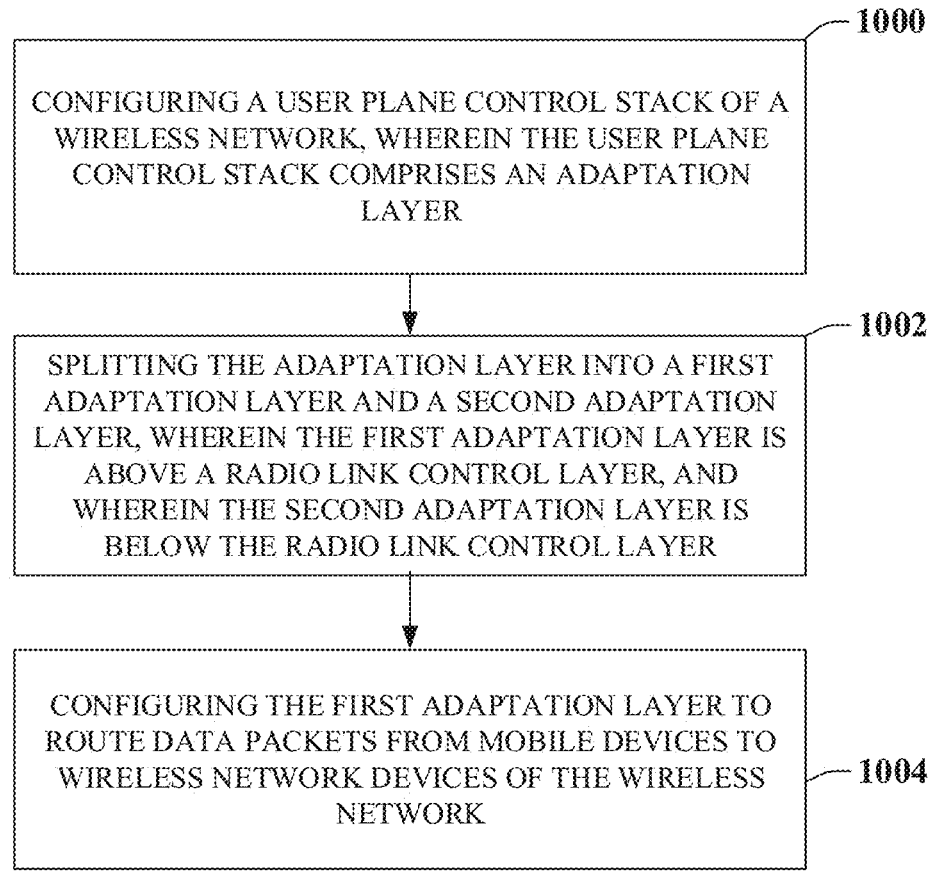
FIG. 10 illustrates an example flow diagram of a method that facilitates an integrated access backhaul network architecture according to one or more embodiments.

Referring now to FIG. 10, illustrated is an example flow diagram of a method that facilitates an integrated access backhaul network architecture according to one or more embodiments. At element 1000, a method comprising configuring, a user plane control stack of a wireless network, wherein the user plane control stack comprises an adaptation layer. At element 1002, the method can also comprise splitting the adaptation layer into a first adaptation layer (e.g., adapt-hi) and a second adaptation layer (e.g., adapt-lo), wherein the first adaptation layer (e.g., adapt-hi) is above a radio link control layer, and wherein the second adaptation layer (e.g., adapt-lo) is below the radio link control layer. Additionally, at element 1004, the method can comprise configuring, by the wireless network device, the first adaptation layer (e.g., adapt-hi) to route data packets from mobile devices (e.g., UE 102) to wireless network devices (e.g., core) of the wireless network.

Figure 11:
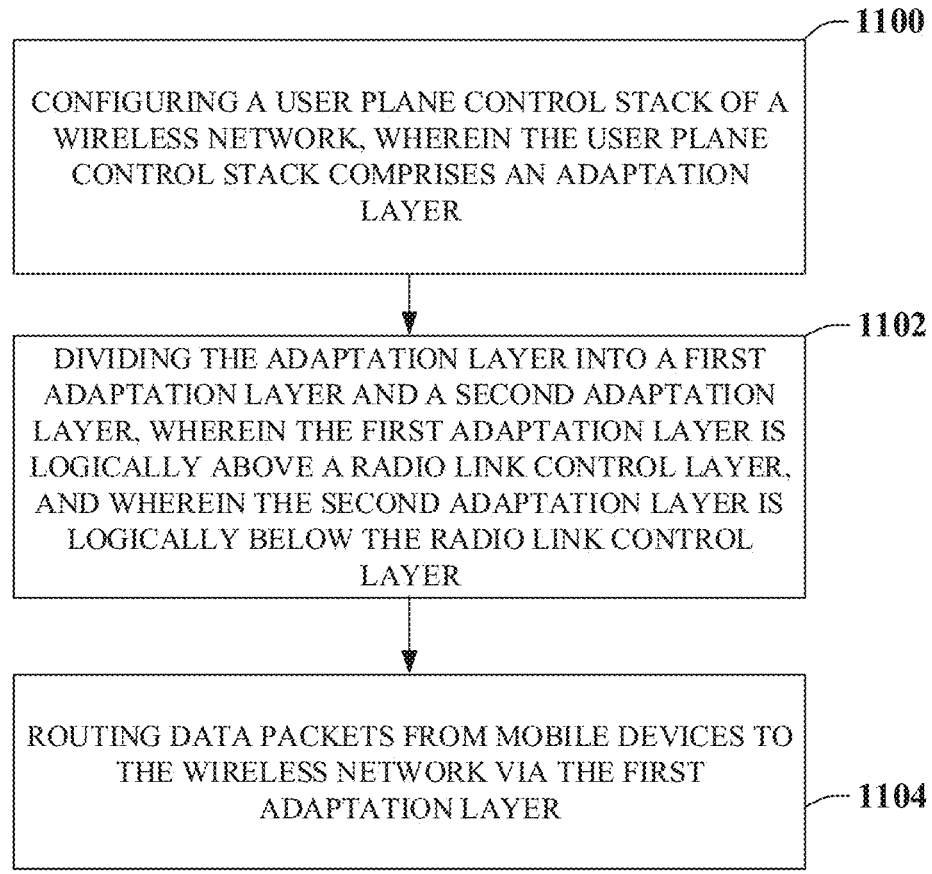
FIG. 11 illustrates an example flow diagram of a system that facilitates an integrated access backhaul network architecture according to one or more embodiments.

Referring now to FIG. 11, illustrated is an example flow diagram of a system that facilitates an integrated access backhaul network architecture according to one or more embodiments. At element 1100, a system can facilitate, configuring a user plane control stack of a wireless network, wherein the user plane control stack comprises an adaptation layer. At element 1102, the system can comprise dividing the adaptation layer into a first adaptation layer (e.g., adapt-hi) and a second adaptation layer (e.g., adapt-lo), wherein the first adaptation layer (e.g., adapt-hi) is logically above a radio link control layer, and wherein the second adaptation layer (e.g., adapt-lo) is logically below the radio link control layer. Furthermore, at element 1104, the system can facilitate routing data packets from mobile devices (e.g., UE 102) to the wireless network (e.g., core) via the first adaptation layer (e.g., adapt-hi).

Figure 12:
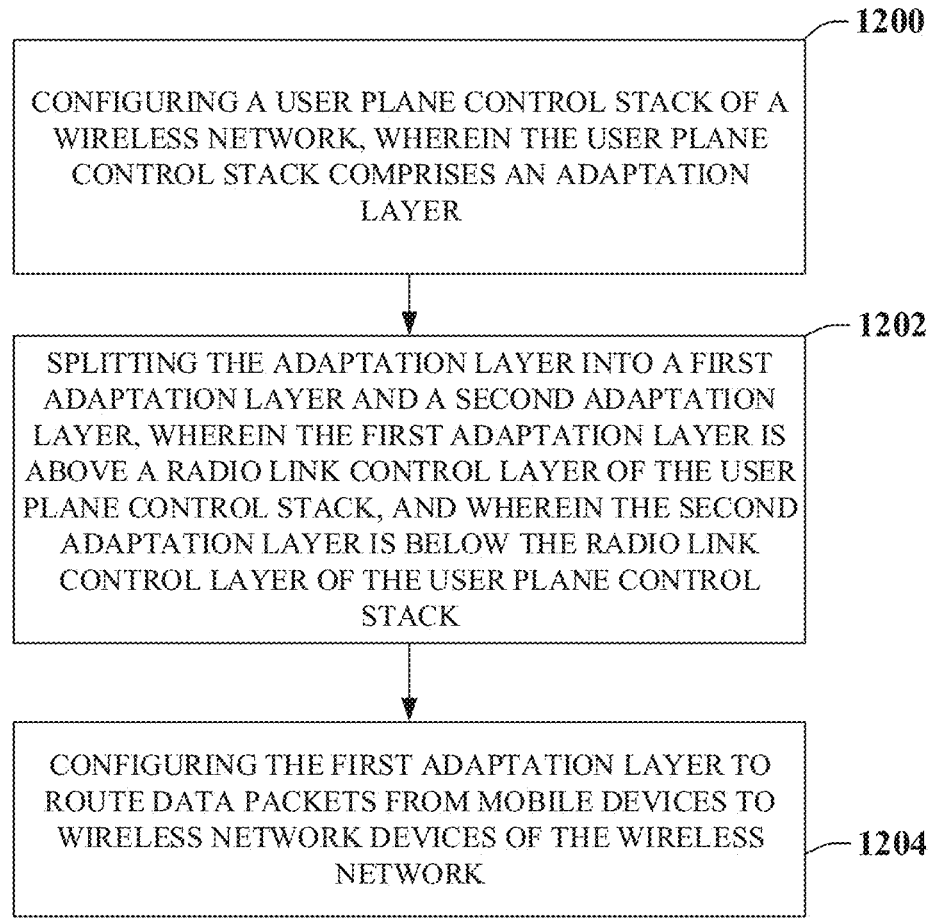
FIG. 12 illustrates an example flow diagram of a machine-readable storage medium that facilitates an integrated access backhaul network architecture according to one or more embodiments.

Referring now to FIG. 12, illustrated is an example flow diagram of a machine-readable storage medium that facilitates an integrated access backhaul network architecture according to one or more embodiments. At element 1200, the machine-readable storage medium can facilitate configuring a user plane control stack of a wireless network, wherein the user plane control stack comprises an adaptation layer. At element 1202, the machine-readable storage medium can perform the operations comprising splitting the adaptation layer into a first adaptation layer (e.g., adapt-hi) and a second adaptation layer (e.g., adapt-lo), wherein the first adaptation layer (e.g., adapt-hi) is above a radio link control layer of the user plane control stack, and wherein the second adaptation layer (e.g., adapt-lo) is below the radio link control layer of the user plane control stack. Furthermore, at element 1204, the machine-readable storage medium can perform the operations comprising configuring the first adaptation layer (e.g., adapt-hi) to route data packets from mobile devices (e.g., UE 102) to wireless network devices (e.g., core) of the wireless network.

Figure 13:
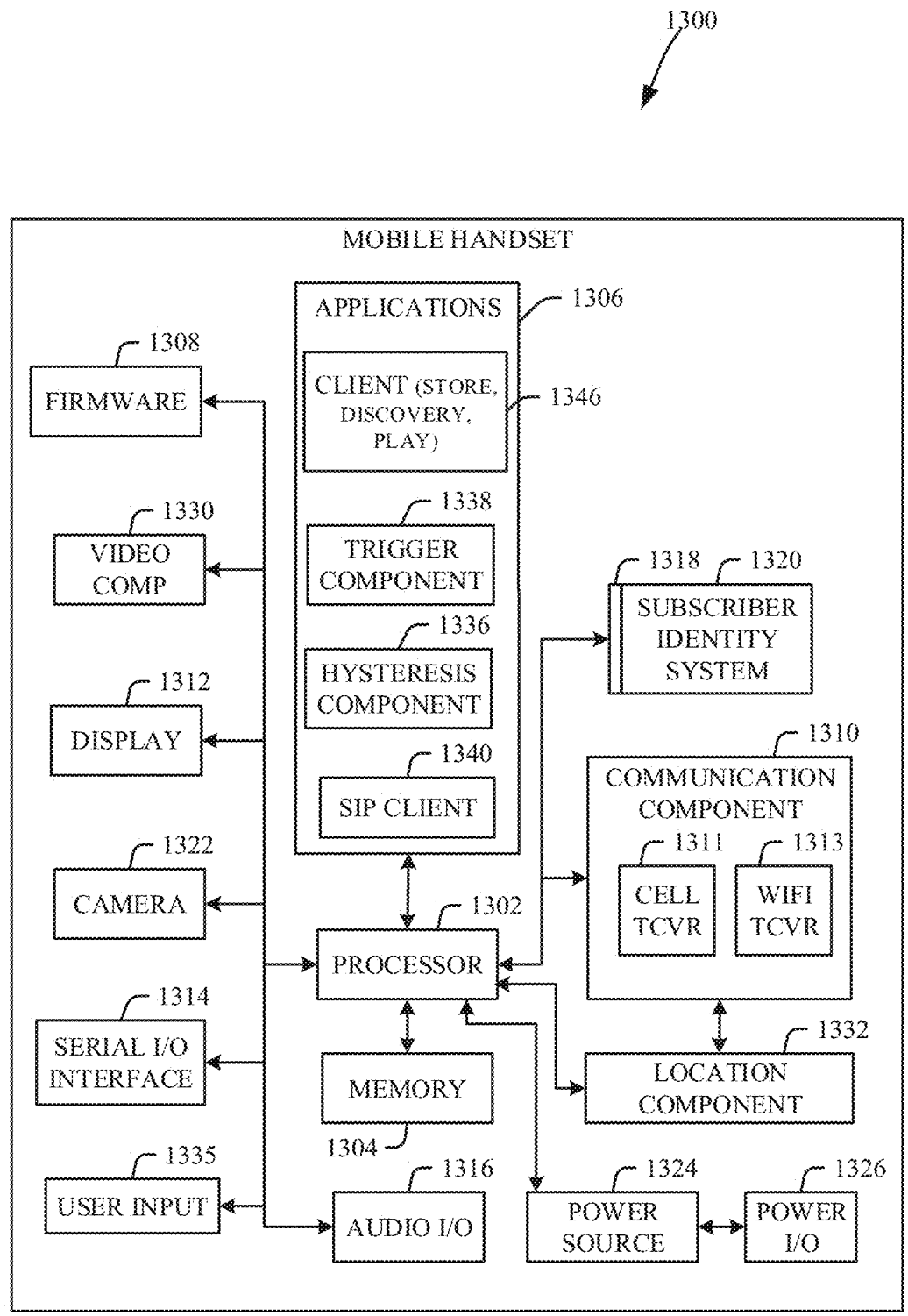
FIG. 13 illustrates an example block diagram of an example mobile handset operable to engage in a system architecture that facilitates secure wireless communication according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
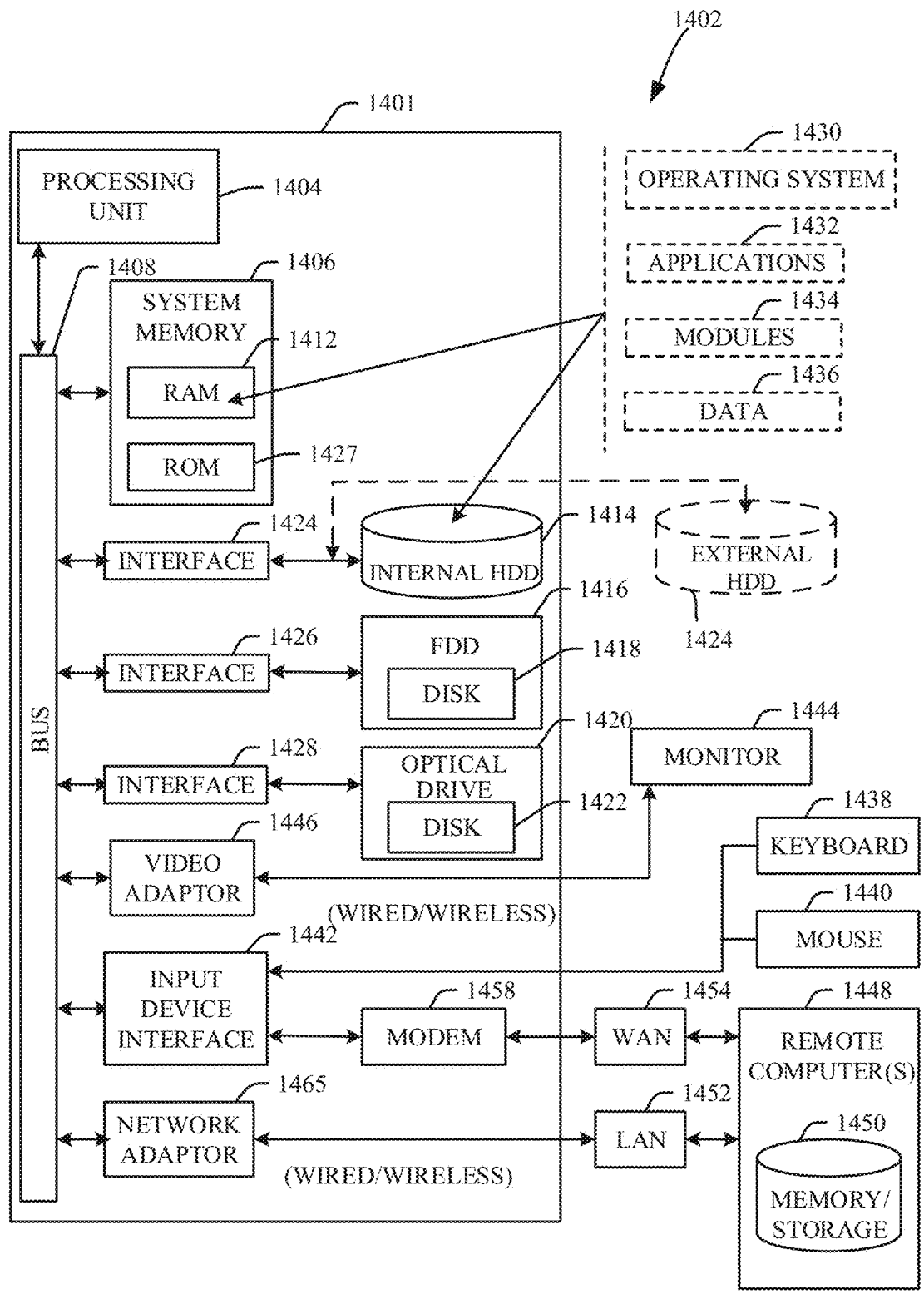
FIG. 14 illustrates an example block diagram of an example computer operable to engage in a system architecture that facilitates secure wireless communication according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 14 is but one example of a computing device.

In order to provide a context for the various aspects of the disclosed subject matter, FIG. 14 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1420 (see below), non-volatile memory 1422 (see below), disk storage 1424 (see below), and memory storage 1446 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 14 illustrates a block diagram of a computing system 1400 operable to execute the disclosed systems and methods in accordance with an embodiment. Computer 1400, which can be, for example, part of the hardware of the computing system 1400, includes a processing unit 1414, a system memory 1416, and a system bus 1418. System bus 1418 couples system components including, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1494), and Small Computer Systems Interface (SCSI).

System memory 1416 can include volatile memory 1420 and nonvolatile memory 1422. A basic input/output system (BIOS), containing routines to transfer information between elements within computer 1400, such as during start-up, can be stored in nonvolatile memory 1422. By way of illustration, and not limitation, nonvolatile memory 1422 can include ROM, PROM, EPROM, EEPROM, or flash memory. Volatile memory 1420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1400 can also include removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 14 describes software that acts as an intermediary between users and computer resources described in suitable operating environment 1400. Such software includes an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be noted that the disclosed subject matter can be implemented with various operating systems or combinations of operating systems.

A user can enter commands or information into computer 1400 through input device(s) 1436. As an example, a mobile device and/or portable device can include a user interface embodied in a touch sensitive display panel allowing a user to interact with computer 1400. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1414 through system bus 1418 by way of interface port(s) 1438. Interface port(s) 1438 include, for example, a serial port, a parallel port, a game port, a universal serial bus (USB), an infrared port, a Bluetooth port, an IP port, or a logical port associated with a wireless service, etc. Output device(s) 1440 and a move use some of the same type of ports as input device(s) 1436.

Thus, for example, a USB port can be used to provide input to computer 1400 and to output information from computer 1400 to an output device 1440. Output adapter 1442 is provided to illustrate that there are some output devices 1440 like monitors, speakers, and printers, among other output devices 1440, which use special adapters. Output adapters 1442 include, by way of illustration and not limitation, video and sound cards that provide means of connection between output device 1440 and system bus 1418. It should be noted that other devices and/or systems of devices provide both input and output capabilities such as remote computer(s) 1444.

Computer 1400 can operate in a networked environment using logical connections to one or more remote computers, such as remote computer(s) 1444. Remote computer(s) 1444 can be a personal computer, a server, a router, a network PC, cloud storage, cloud service, a workstation, a microprocessor based appliance, a peer device, or other common network node and the like, and typically includes many or all of the elements described relative to computer 1400.

For purposes of brevity, only a memory storage device 1446 is illustrated with remote computer(s) 1444. Remote computer(s) 1444 is logically connected to computer 1400 through a network interface 1448 and then physically connected by way of communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1450 refer(s) to hardware/software employed to connect network interface 1448 to bus 1418. While communication connection 1450 is shown for illustrative clarity inside computer 1400, it can also be external to computer 1400. The hardware/software for connection to network interface 1448 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

Performing aggregation above the RLC makes it possible to perform the routing and aggregation at the same protocol sublayer. Thus, additional possibilities in terms of taking into account routing information while performing bearer aggregation can be used to facilitate a more efficient system. Additionally, it also reduces the impact on standards for lower protocol stack layers. Similarly, the benefits of performing aggregation below the RLC are that it can reduce the demand for LCID space extension when trying to support 1:1 mapping of UE bearers to backhaul channels.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method, comprising:
configuring, by first network equipment comprising a processor, a user plane control stack enabled via a network, wherein the user plane control stack comprises an adaptation layer;
splitting, by the first network equipment, the adaptation layer into a first adaptation layer and a second adaptation layer, wherein the first adaptation layer is above a radio link control layer, and wherein the second adaptation layer is below the radio link control layer;
configuring, by the first network equipment, the first adaptation layer to aggregate data packets from user equipments, the data packets being routed from the user equipments to second network equipment that is part of the network; and
in response to configuring the first adaptation layer, configuring, by the first network equipment, the second adaptation layer as a pass-through layer between a media access control layer and the radio link control layer enabled via the network.

2. The method of claim 1, further comprising:
receiving, by the first network equipment, first data from a first user equipment of the user equipments and second data from a second user equipment of the user equipments.

3. The method of claim 1, further comprising:
configuring, by the first network equipment, the first adaptation layer to route the data packets from the user equipments to the second network equipment.

4. The method of claim 1, further comprising:
aggregating, by the first network equipment, first data from a first user equipment of the user equipments and second data from a second user equipment of the user equipments at the adaptation layer, resulting in aggregated data to be carried by a backhaul bearer enabled via the network.

5. The method of claim 4, wherein aggregating the first data and the second data is based on a first condition associated with a quality of service of a bearer channel of the second user equipment being determined to have been satisfied and a second condition associated with a data route for the second data being determined to have been satisfied.

6. The method of claim 1, wherein the first adaptation layer is configured to aggregate the data packets during a data aggregation mode associated with the first adaptation layer.

7. The method of claim 1, further comprising:
configuring, by the first network equipment, the second adaptation layer to receive aggregated data from the radio link control layer and send the aggregated data to the media access control layer.

8. A system, comprising:
a processor; and
a memory that stores executable instructions that, when executed by the processor, facilitate performance of operations, comprising:
configuring a user plane control stack, wherein the user plane control stack comprises an adaptation layer;

dividing the adaptation layer into a first adaptation layer and a second adaptation layer, wherein the first adaptation layer is logically above a radio link control network layer, and wherein the second adaptation layer is logically below the radio link control network layer;

configuring the first adaptation layer to aggregate data packets routed from user equipments to network equipment; and in response to configuring the first adaptation layer, configuring the second adaptation layer as a pass-through layer between a media access control network layer and the radio link control network layer.

9. The system of claim 8, wherein the user equipments comprises a first user equipment and a second user equipment, and wherein the operations further comprise:

aggregating, via the second adaptation layer, first data from the first user equipment and second data from the second user equipment, resulting in aggregated data for transmission.

10. The system of claim 8, wherein the user equipments comprises a first user equipment and a second user equipment, and wherein the operations further comprise:

aggregating, via the first adaptation layer, first data from the first user equipment and second data from the second user equipment, resulting in aggregated data for transmission via a network backhaul bearer.

11. The system of claim 8, wherein the operations further comprise:

routing the data packets from the user equipments to the network equipment via the first adaptation layer.

12. The system of claim 8, wherein the operations further comprise:

receiving, via the second adaptation layer, aggregated data from the radio link control network layer.

13. The system of claim 12, wherein the operations further comprise:

transmitting, via the second adaptation layer, the aggregated data to the media access control network layer.

14. The system of claim 13, wherein transmitting the aggregated data to the media access control network layer is performed while the second adaptation layer is in a transparent mode.

15. The system of claim 8, wherein routing the data packets is performed while the first adaptation layer is in a routing mode.

16. A non-transitory machine-readable medium, comprising executable instructions that, when executed by a processor, facilitate performance of operations, comprising:

configuring a user plane control stack enabled via a network, wherein the user plane control stack comprises an adaptation layer;

from the adaptation layer, generating a first adaptation layer and a second adaptation layer, wherein the first adaptation layer is generated to be above a radio link control layer of the user plane control stack, and wherein the second adaptation layer is generated to be below the radio link control layer of the user plane control stack;

configuring the first adaptation layer to aggregate data packets from mobile devices that are routed to network equipment; and in response to configuring the first adaptation layer, configuring the second adaptation layer as a pass-through layer between a media access control layer and the radio link control layer.

17. The non-transitory machine-readable medium of claim 16, wherein the mobile devices comprise a first mobile device and a second mobile device, and wherein the operations further comprise:

aggregating first data from the first mobile device and second data from the second mobile device, resulting in aggregated data for transmission via a backhaul bearer associated with the network.

18. The non-transitory machine-readable medium of claim 17, wherein aggregating the first data and the second data is performed during a data aggregation mode associated with the first adaptation layer.

19. The non-transitory machine-readable medium of claim 16, wherein configuring the second adaptation layer further comprises:

configuring the second adaptation layer to aggregate the data packets that are routed from the mobile devices to the network equipment, resulting in a reduced logical channel identifier space extension associated with the network.

20. The non-transitory machine-readable medium of claim 16, wherein the operations further comprise:

configuring the first adaptation layer to route the data packets from the mobile devices to the network equipment associated with the network.

* * * * *